June 11, 1963  A. C. SAMPIETRO  3,092,970
VARIABLE RATIO HYDRAULIC VEHICLE DRIVE
Filed Nov. 16, 1960  2 Sheets-Sheet 1
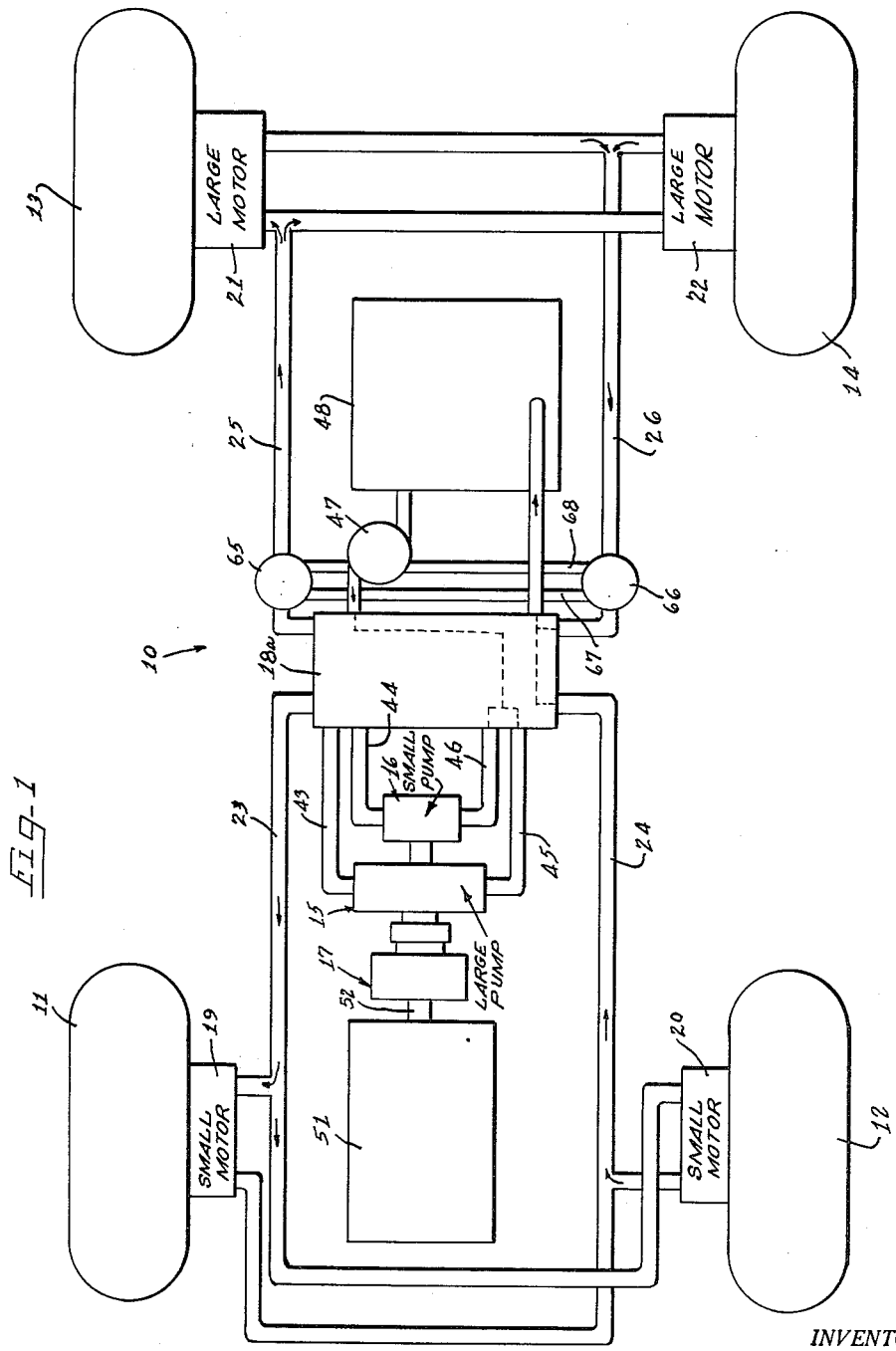
INVENTOR.
Achilles C. Sampietro
BY
Hill, Sherman, Meroni, Gross & Simpson
ATTORNEYS

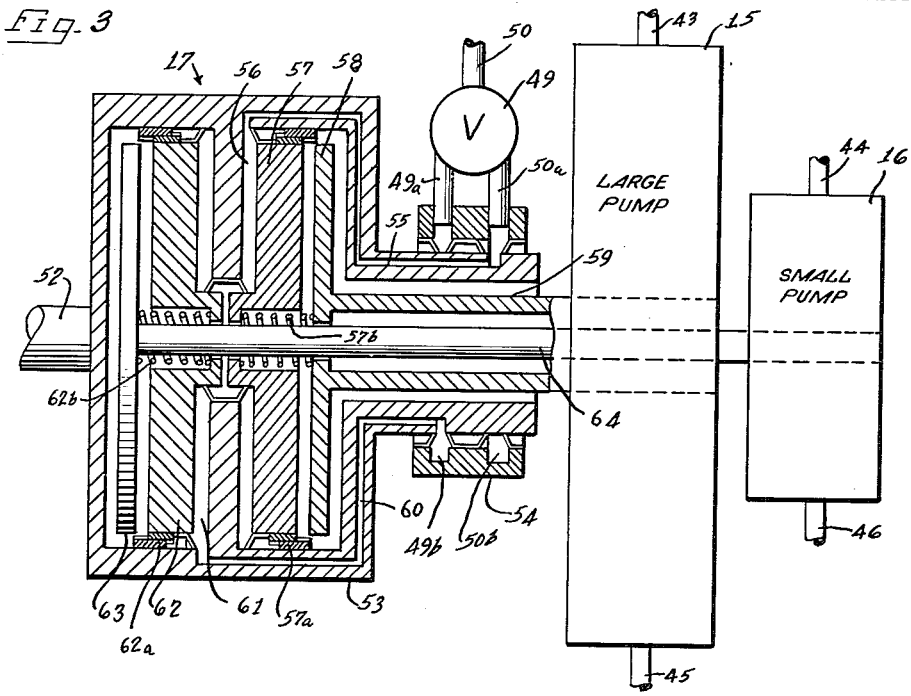
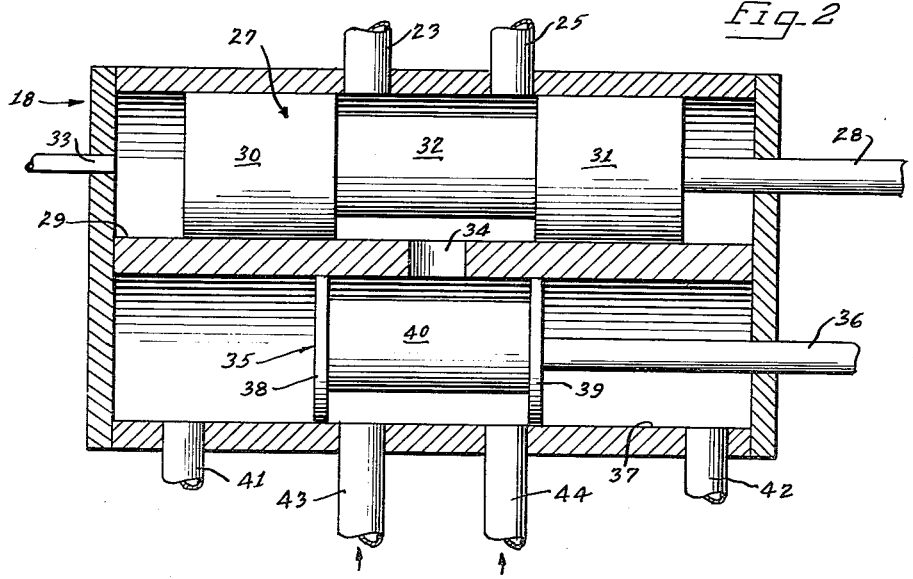

United States Patent Office 3,092,970
Patented June 11, 1963

3,092,970
VARIABLE RATIO HYDRAULIC VEHICLE DRIVE
Achilles C. Sampietro, Birmingham, Mich., assignor to Thompson Ramo Wooldridge Inc., Cleveland, Ohio, a corporation of Ohio
Filed Nov. 16, 1960, Ser. No. 69,666
4 Claims. (Cl. 60—53)

The present invention relates to improvements in driving transmissions for vehicles and particularly to a hydraulic transmission providing a series of torque reduction ratios without requiring variable delivery pumps or motors.

The present invention contemplates providing first and second hydraulic pumps driven at the same speed by the vehicle engine and having different displacements. Hydraulic motors are connected to each of the wheels of the vehicles with each pair of wheels across the vehicle having motors of different displacements. A control valve arrangement is provided in conduits connected between the pumps and motors so that the output of either or both of the pumps may be selectively delivered to each of the motors or to a combination of the motors to obtain a wide range of speed ratios.

An object of the invention is to provide a fluid system for transmitting power to the wheels of a vehicle utilizing constant displacement pumps and motors and a simplified control which obtains a wide range of speed ratios between the vehicle engine and the vehicle wheels by directly transmitted hydraulic power.

Another object of the invention is to provide a fluid power transmission for vehicles wherein the system inherently and automatically increases the number of wheels being driven at lower speeds and higher torque to increase the traction and reduces the number of wheels being driven at higher speeds.

A further object of the invention is to provide a fluid power transmission system for a vehicle adaptable to use with different vehicles having different numbers of wheels.

Other objects and advantages will become more apparent with the teachings of the principles of the invention in connection with the disclosure of the preferred embodiment thereof in the specification, claims and drawings, in which:

FIGURE 1 is a top plan view of a vehicle and power transmission system shown in schematic form constructed in accordance with the principles of the present invention;

FIGURE 2 is an enlarged sectional view shown in somewhat schematic form of the selective control valve of the mechanism of FIGURE 1; and FIGURE 3 is a sectional view shown in schematic form of the clutch arrangement for driving the pumps of the mechanism of FIGURE 1.

As shown on the drawings:

FIGURE 1 shows a motor driven vehicle 10 supported on wheels 11, 12, 13 and 14. Power for driving the vehicle is delivered through a large pump 15 and a small pump 16, FIGURES 1 and 3, which are driven through the clutch 17.

The output from the pumps 15 and 16 is selectively controlled by a control valve 18, FIGURE 2 within a housing 18a, FIGURE 1, and the hydraulic fluid is selectively delivered to motors 19, 20, 21 and 22 respectively drivingly connected to each of the wheels 11, 12, 13 and 14.

The control valve 18, FIGURES 1 and 2, is constructed to selectively deliver the hydraulic fluid to the hydraulic motors 19 and 20 for the front wheels 11 and 12 through a hydraulic conduit 23, or to the hydraulic motors 21 and 22 for the rear wheels 13 and 14 through a conduit 25, or to deliver simultaneously to both conduits 23 and 25. The exhaust or discharge fluid from the motors 19 and 20 returns through a line 24 and the return fluid from the rear motors 21 and 22 returns through a line 26. The motors for each of the wheels may be of various well known types having a constant displacement and need not be described in detail. Gear motors or sliding vane motors for example may be employed. Similarly the pumps 15 and 16 need not be shown in detail and any one of various well known types of hydraulic pumps may be selected. The pumps have a constant displacement or have a fixed relationship between output and speed and pumps such as gear pumps or vane pumps may be employed.

The control valve employs a valve spool 27 slidable in a valve cylinder 29 provided in a housing for the valve and the position of the spool is controlled by a valve control rod 28 connected to the spool. The spool has cylindrical lands 30 and 31 positioned at the ends of a reduced portion 32 providing a flow passage for fluid entering the cylinder 29 through a valve port 34 and flowing out through one or both of the outlet conduits 23 and 25. A vent 33 is provided at one end of the cylinder 29 to permit shifting of the valve spool 27.

From FIGURE 2 it will be apparent that in the position shown, the valve spool directs fluid from the port 34 through both of the conduits 23 and 25. When the valve spool is shifted to the left, the land 31 blocks the conduit 25 and the fluid flows out only through the conduit 23 to the motors 19 and 20 for the front wheels. When the spool 27 is shifted to the right the conduit 23 is blocked and fluid flows out only through the conduit 25 to the rear motors 21 and 22.

Fluid is selectively delivered from either the large pump 15 or the small pump 16 or both the pumps as determined by the setting of the control valve 18, and for this purpose a valve spool 35 is slidably mounted in a cylinder 37 and the position of the spool is controlled by a rod 36. The spool has lands 38 and 39 with a reduced portion 40 therebetween, and the reduced portion forms a passage through the cylinder 37 from a conduit 43 from the large pump and a conduit 44 from the small pump to the port 34.

As may be seen from FIGURE 2, when the valve spool 35 is in the centered position flow from both of the pumps is delivered to the motors. When the valve spool 35 is shifted to the right, flow from the small pump 16 alone is delivered to the motors, and the flow from the large pump through conduit 43 escapes through a return conduit 41 which leads to a reservoir 48. When the valve spool is shifted to the left, flow only from the large pump 15 is delivered to the motors and the flow from the small pump escapes through the return line 42 back to the reservoir 48.

The pumps 15 and 16 are kept charged by a small charging pump 47 which receives the fluid from the reservoir 48 and return flow from each of the motors through the lines 24 and 26, and from the pump not being used, flows into the reservoir.

The pumps 15 and 16 are driven from a prime mover provided by an engine 51 for the vehicle and the engine crankshaft 52 drives the pumps through the clutch 17. Both pumps 15 and 16 may be simultaneously driven in a preferred form and the output controlled by the valve spool 35 of FIGURE 2. This provides available fluid pressure for speed changes of the vehicle. However, if the vehicle is to be driven at a speed requiring the output of only one pump over a long period of time, a clutch control arrangement may be provided so that the other pump need not be driven. As shown in FIGURE 3, the clutch 17 is operated by fluid pressure received through a line 50 and controlled by a valve 49. The valve selectively pressurizes lines 49a and 50a or pressurizes both lines. The mechanism of the clutch 17 is enclosed in a housing 53, and for directing fluid through the housing a sealed non-rotational sleeve 54 having annular passages 49b and 50b therein is provided. For driving the large pump 15 the valve 49 is set to pressurize the line 50a thereby pressurizing the annular passage 50b and a passage 55 to pressurize a clutch chamber 56 and move a circular clutch plate 57 into engagement with a mating clutch plate 58 connected to a tubular shaft 59 for driving the large pump 15. The clutch plate 57 is suitably locked to the housing 53, which is driven in rotation with the crankshaft 52, such as by splines 57a which permit axial movement of the plate 57, and the plate is urged to non-engaged position by a spring 57b.

For driving the small pump 16, the valve 49 pressurizes the line 49a to pressurize the annular passage 49b and a passage 60 thereby pressurizing a clutch chamber 61 and moving a rotating clutch plate 62 against a mating clutch plate 63 to drive a shaft 64 for the small pump 16. The plate 62 is locked such as by splines 62a to rotate with the housing 53 and it can move axially and is urged to non-engaged position by a spring 62b.

The motors 19 and 20 for the front wheels of the vehicle have a different displacement than the motors for the rear wheels 21 and 22. Thus, for any fixed delivery such as by the small pump 16, where the front wheel motors 19 and 20 are chosen with a smaller displacement than the motors 21 and 22 for the rear wheels; a first speed is obtained by deliverying fluid at a constant rate to all of the motors so as to be divided between the front and rear motors, a second higher speed is obtained by delivering fluid to the rear motors 21 and 22 alone, and a highest speed is obtained by delivering fluid to the front wheel motors 19 and 20. This change of course is obtained by changing the setting of the valve spool 27, FIGURE 2. For any fixed setting of the valve spool 27, by changing the position of the valve spool 35, a first speed will be obtained by delivery of fluid solely from the small pump 16, a next higher speed will be obtained by delivering fluid solely from the large pump 15, and a still higher speed obtained by delivery of fluid from both of the pumps 15 and 16. Thus it will be seen that different permutations are available to give different speed ratios.

For example if the displacement of the front wheel motors 19 and 20 is $1a$ cubic inch per revolution for each motor, and the displacement of the rear wheel motors 21 and 22 is $1.5a$ cubic inches per revolution for each motor, and the displacement of the small pump 16 is $1a$ cubic inch per revolution and the displacement of the large pump 15 is $2.8a$ cubic inches per revolution, then the following chart will show the ratios available:

|  | Small pump 16 | Large pump 15 | Both pumps 15 and 16 |
| --- | --- | --- | --- |
| All wheels | $1/k(2+3)$ | $2.8/k(2+3)$ | $1+2.8/k(2+3)$ |
| Rear wheels only | $1/3k$ | $2.8/3k$ | $1+2.8/3k$ |
| Front wheels only | $1/2k$ | $2.8/2k$ | $3.8/2k$ | or we will have a ratio spread from $1/5k$ to $1.9/k$ for a total of 9.5.

The system can be extended to vehicles with more than 2 axles, and it may be particularly useful for transmitting power to the wheels of a semi-trailer. It will be clear that the more axles there are, the more permutations will be available, and also that more than two pumps can be driven by the prime mover.

With the above relationship between motor and pump displacements, the following chart indicates a range of speeds that is available for a vehicle at the same engine r.p.m.

|  | Small pump | Large pump | Both pumps |
| --- | --- | --- | --- |
| Four wheels | 9.42 | 26.6 | 36.0 |
| Rear wheels | 15.7 | 44.4 | 60.1 |
| Front wheels | 23.5 | 66.5 | 90.0 |

Thus it will be seen that a vehicle speed at or close to any desirable speed can be obtained by controllably selecting the proper combination of pumps and motors while maintaining the speed of the vehicle engine at a desirable or at an optimum r.p.m. For increasing the speed stepwise, the small pump alone is operated and sequentially the motors are cut in so that four wheels drive, the rear wheels next are driven alone, and the front wheels next are driven alone. The large pump then is cut in and first the four wheels are driven together, then both pumps drive the four wheels, next the rear wheels are driven by the large pump and so forth. In reducing speed from top speed, at top speed both pumps drive the front wheels, the small pump is then cut out so that the large pump alone drives the front wheels, both pumps then drive the rear wheels and so on as will be apparent from the above chart. The arrangement of ratios and relationships above is preferred inasmuch as it provides for substantially uniform stepwise increase or decrease in vehicle speed and provides a wide range of speeds.

The vehicle can be driven in reverse by changing the connection of the pump output so that the fluid flows in reverse through the motors. For example, as illustrated in FIGURE 1, valves 65 and 66 may be provided with interconnecting lines 67 and 68 and the valve, for reversing the direction of the vehicle, will be set so that fluid is delivered to the rear motors 21 and 22 through the line 26 and returned through the line 25. The structure illustrated operates to reverse the rear motors only and during reverse operation the conduit 23 to the front wheel motors 19 and 20 will be shut off. Of course a similar valve arrangement can be employed if the front wheel motors are also to be reversed.

In operation, the operator starts the engine 51 and engages clutches 17 to drive the pumps 15 and 16. The valve control rods 28 and 36 are then operated to deliver fluid to the motors 19, 20, 21 and 22 to obtain the speed of vehicle propulsion desired. To gradually increase the speed the valve 18 is set to progressively deliver fluid from the small pump first to all the motors at the constant rate of output of the small pump, and pairs of motors are successively blocked with the motors of the largest displacement blocked first. The operator then shifts to the large pump to further increase speed and for the greater speed ratios the delivery from both the pumps is employed in the manner illustrated in the chart above and dependent upon the speed ratios chosen for the pumps and motors.

Thus it will be seen that I have provided an improved fluid power transmission system which meets the objectives and advantages above set forth. The mechanism operates at a high efficiency and uses simplified structure obtaining good reliability.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A hydraulic drive system for a vehicle comprising a first hydraulic pump having a predetermined fixed displacement, a second hydraulic pump having a predetermined fixed larger displacement, a first hydraulic motor for connection to a wheel of a vehicle having a predetermined first fixed displacement, a second hydraulic motor for connection to another wheel of the vehicle having a predetermined second larger fixed displacement, conduit means connected between the pumps and the motors for delivering the outputs of the pumps to the motors, and valve means in said conduit means for selectively delivering the output of either one or both of said pumps to either one or both of said motors, said predetermined displacements chosen so that successive speed increase can be obtained in a predetermined pattern without requiring change in the pump speed by connecting in sequence the first pump to the first and second motors, then to the second motor, and then to first motor; then connecting the second pump to the first and second motors, then to the second motor, and then to the first motor; and then connecting both the first and second pumps to the first and second motors, then to the second motor, and then to the first motor.

2. A hydraulic drive system for a vehicle supported on wheels comprising in combination first and second hydraulic motors having different displacements for connection to different wheels of the vehicle, first and second hydraulic pumps having different displacements, a prime mover, first and second clutches connected between said prime mover and said pumps for selectively driving said pumps, first and second hydraulic operators connected to said clutches, a fluid flow control valve connected to said hydraulic operators for selectively engaging either of the clutches or for engaging both of said clutches, conduit means between said pumps and motors for delivering the hydraulic fluid output of the pumps to the motors, first valve means in said conduit means for selectively delivering the output of either or both of said pumps to said motors, and second valve means in said conduit means downstream of said first valve means for delivering the fluid from the first valve means to either or both of said motors.

3. A hydraulic drive system for a vehicle comprising first and second power driven hydraulic pumps having different displacements, first and second motors having different displacements for connection to different wheels of a vehicle, conduit means between said pumps and motors for delivering the hydraulic fluid output of the pumps to the motors, a prime mover, clutch means between said prime mover and said pumps for selectively driving said pumps, first valve means in said conduit means having first, second and third positions for selectively delivering the output of either said first, said second or both of said pumps to said motors in said respective positions, second valve means in said conduit means downstream of said first valve means for delivering the fluid from said first valve means to either or both of said motors, and a single common passage forming part of said conduit means and providing communication between said first and second valve means, said second pump being blocked from said passage in the first position of said first valve means, and said first pump being blocked from said passage in the second position of said first valve means.

4. A hydraulic drive system for a vehicle comprising first and second power driven hydraulic pumps having different displacements, first and second motors having different displacements for connection to different wheels of a vehicle, conduit means between said pumps and motors for delivering the hydraulic fluid output of the pumps to the motors, a prime mover, clutch means between said prime mover and said pumps for selectively and independently driving said pumps, first valve means in said conduit means having first, second and third positions for selectively delivering the output of either said first, said second or both of said pumps to said motors in said respective positions, second valve means in said conduit means downstream of said first valve means for delivering the fluid from said first valve means to either or both of said motors, and a single common passage forming part of said conduit means and providing communication between said first and second valve means, said second pump being blocked from said passage in the first position of said first valve means, and said first pump being blocked from said passage in the second position of said first valve means.

References Cited in the file of this patent
UNITED STATES PATENTS

| | | |
|---|---|---|
| 1,047,329 | Sundh | Dec. 17, 1912 |
| 1,156,818 | Rich | Oct. 12, 1915 |
| 1,926,692 | Tarbox | Sept. 12, 1933 |
| 1,987,698 | Montelius | Jan. 15, 1935 |
| 2,103,530 | Henry | Dec. 28, 1937 |
| 2,276,895 | Vosseler et al. | Mar. 17, 1942 |
| 2,370,526 | Doran | Feb. 27, 1945 |
| 2,681,117 | Marcy | June 15, 1954 |